3,510,436
CORROSION INHIBITION IN WATER SYSTEM
Ronald M. Silverstein, Parsippany, N.J., and Chester A. Bishof, North Hills, and Joseph T. Matey, Levittown, Pa., assignors to Betz Laboratories, Inc., Trevose, Pa., a corporation of Pennsylvania
Continuation-in-part of application Ser. No. 450,220, Apr. 22, 1965. This application Oct. 31, 1968, Ser. No. 772,354
Int. Cl. C23f 11/08, 11/10, 11/18
U.S. Cl. 252—389          21 Claims

ABSTRACT OF THE DISCLOSURE

The present disclosure relates to corrosion inhibition in water systems, particularly industrial water systems and especially those in which circulating water is present. According to the present invention, a composition comprising at least one water-soluble, organic derivative of an acid of phosphorus in combination with a water soluble zinc compound and/or mercaptobenzothiazole is added to the system to be treated.

This application is a continuation-in-part of co-pending application Ser. No. 450,220 filed Apr. 22, 1965, and now abandoned.

BACKGROUND OF THE INVENTION

The technology of water-treatment, whether it be for industrial or domestic purposes has reached a high degree of sophistication. The industry is constantly seeking new materials to either replace those which are currently being used or to enhance those already in use.

The materials or composition must fulfill a number of prerequisites of which may be mentioned water-solubility, non-toxicity to both humans and marine-life, hydrolytic stability and of course, corrosion inhibiting and anti-scale forming properties.

In view of the recent Federal and state limitations, the toxicity of these materials has become a critical consideration. Chromate treatments have found very successful use, but because of the toxicity of this family of compounds, additional treatment compositions which contain no chromates are becoming more and more desirable. With the foregoing objectives in mind, applicants commenced a comprehensive research program which led to the discovery as explained hereafter.

GENERAL DESCRIPTION OF THE INVENTION

It was discovered that the foregoing prerequisites could be attained if the particular systems were treated with a composition comprising:

(1) A water-soluble acid of phosphorus having (i) at least one OA grouping attached directly to a phosphorus atom of said acid, where A represents sodium, barium, potassium, ammonium or hydrogen (ii) at least one substituent group attached to a phosphorus atom of said acid selected from the class consisting of

(a) an alkyl of from 1 to 25 carbon atoms
(b) an alkenyl of from 1 to 25 carbon atoms
(c) a mononuclear aryl group, and (d) an aliphatic hydrocarbon substituted mononuclear aryl group wherein the aliphatic hydrocarbon has from 1 to 20 carbon atoms, or the corresponding anhydride of said acid, and (2) At least one corrosion inhibitor selected from the group consisting of a water-soluble zinc compound and mercaptobenzothiazole.

The composition is added to the system in an amount effective to significantly inhibit corrosion of the system.

Some of the acids of phosphorus which are to be used according to the invention may be further described according to the following generic chemical formula:

wherein R is as later defined; X is A or R; A is hydrogen, sodium, barium, potassium or ammonium and $m$ is an integer of from 1 through 3.

It is also intended that the amine and amide compounds containing the acid of phosphorus groupings as defined above may be utilized along with the sulfonated and mercapto derivatives. R as set forth above may be more specifically defined as being an alkyl group having from one to 25 carbon atoms in the carbon chain (straight or branched), preferably 4 to 20 atoms in the carbon chain (straight or branched), and most desirably 8 to 10 carbon atoms in the carbon chain (straight or branched), or a mono or poly unsaturated alkenyl group having from 1 to 25 carbon atoms in the carbon chain (straight or branched), and most desirably 8 to 10 carbon atoms in the carbon chain (straight or branched), or a mononuclear aryl group, or a mononuclear aryl group substituted by one or more alkyl or alkenyl groups having 1 to 20 carbon atoms in the carbon chain (straight or branched), preferably 8 to 10 carbon atoms in the carbon chain (straight or branched).

Moreover it is also beneficial to use a substituted acid of phosphorus of the character referred to above in which ethylene oxide groups have been substituted to form adducts, there being from 1 to 50 ethylene oxide groups in the molecule, preferably from 1 to 30 and most desirably from 1 to 10.

The compositions of the invention should be such as to be fed to the circulating water in the following concentrations:

(A) 1 to 200 p.p.m. of the substituted acid of phosphorus,
(B) (A) plus zinc ion between 0.5 and 50 p.p.m., preferably 1 to 25 p.p.m.,
(C) (B) plus mercaptobenzothiazole between 0.5 and 50 p.p.m., preferably 1 to 25 p.p.m.,
(D) (A) plus mercaptobenzothiazole between 0.5 and 50 p.p.m., preferably 1 to 25 p.p.m.

It is apparent from the foregoing that when the composition contains the acid of phosphorus in the designated amounts together with either of the corrosion inhibitors, it contains approximately 66 to 80% by weight of the acid and 20 to 33% of the respective corrosion inhibitor. When both inhibitors are included in the composition, the composition contains from about 50 to 66% by weight of the acid and from 16 to 25% of each of the inhibitors.

The drawings contain representative curves which will be useful in explaining the invention.

There are available on the market a number of different organic esters of acids of phosphorus of which may be mentioned orthophosphoric, monosubstituted orthophosphoric acid and di-substituted orthophosphoric acid respectively which have the formulas:

wherein R is an organic group which is specifically exemplified later and A is a cation as later defined or hydrogen.

Similar type compounds are formed by substituting for hydrogen groups in polyphosphoric acid and pyrophosphoric acid e.g. the di-substituted pyrophosphoric acid has the formula:

wherein R may be a straight or branched chain alkyl group having a carbon chain length of 1 to 25 carbon atoms, preferably 4 to 20 and most desirably 8 to 10. Thus, for example, the alkyl group can be methyl, ethyl, propyl, butyl, hexyl, octyl, or stearyl. R may also be alkenyl, either mono-unsaturated or poly-unsaturated, having a carbon range between 1 and 25 carbon atoms, straight or branched, and preferably between 4 and 20 but most desirably between 8 and 10 carbon atoms. Suitable groups will be oleyl, linoleyl, linolenyl, ricinoleyl, eleosteryl, octenyl, dodecenyl, hexenyl, and butenyl.

The R group may also be aryl, suitably phenyl. R may also be an alkyl or alkenyl mono-substituted or poly-substituted aryl group, where the alkyl or alkenyl substituent has between 1 and 20 carbon atom atoms in the carbon chain and preferably 8 to 10 carbon atoms in the carbon chain. Suitable examples are cresyl, nonylphenyl, octylphenyl, hexylphenyl, tridecylphenyl, amylphenyl, isoamylphenyl, ethylphenyl, isobutylphenyl, dioctylphenyl, or di-nonylphenyl.

Moreover the fundamental organic acid of phosphorus structure can be modified by inclusion of ethylene oxide in the molecule. While the illustration below shows ethylene oxide substituted in an orthophosphoric acid, it will be understood that other acids of phosphorus such as poly-phosphoric acid can likewise be substituted. The substitution of the ethylene oxide can be either on the nucleus or on the side chain as shown in the two formulas below:

Nucleus ethoxylation

Side chain ethoxylation

In the above formula, A may be hydrogen, or a cation such as sodium, potassium, barium, or ammonium. B may be hydrogen, —(CH$_2$CH$_2$O)$_x$H, an ethoxylated alkyl or aryl group of the character of R as above-defined or cations as referred to for A. In all instances $x$ represents a number of from 1 to 50.

These organic phosphoric acids can be further modified by substitution of other atoms such as nitrogen. Typical amide phosphoric acid esters are shown below:

Primary amide ester

Secondary amide ester wherein R and A are as above defined.

Similar compounds of sulphur can be produced in which the sulphur performs either a bridging role or is in an isolated position as shown below:

Bridging role

Isolated role

Here again the second OA group can be replaced by an RS group to form a di-substituted ester and again R and A are as above-defined.

The preparation of these organic acids of phosphorus is disclosed in the literature. It involves the reaction of an organic compound containing an active hydrogen such as an alcohol with a phosphating agent such as phosphorus oxychloride, phosphorus trichloride, phosphorus pentoxide, 115% phosphoric acid, 105% phosphoric acid or 75% phosphoric acid under controlled conditions as described in the art. The preferred organic compound is an ethoxylated aliphatic alcohol or ethoxylated alkyl phenol. (See U.S. Pats. 3,004,056, 3,004,057 and 3,033,-889 and Technical Publication–FMC Technical Data on FMC Superphosphoric Acid 105% and FMC Polyphosphoric Acid 115% published by FMC Corporation, Inorganic Chemicals Division.)

Similarly, ethoxylated amines, amides, and other similar active hydrogen-bearing compounds may be used in place of the alcohol.

The quantity of ethylene oxide per molecule of the organic acid of phosphorus will suitably range from 1 to 50 mols, preferably 1 to 10 mols, and most desirably 1 to 5 mols.

A typical ethoxylated di-substituted acid of phosphorus is shown in the following generic formula:

wherein R and A are as above-defined and $x$ equals from 1 to 50.

As a specific and preferred acid of this type may be exemplified

Typical formulas for various organic substituted acids of phosphorus where R is alkyl-aryl are shown in the following formulas.

Alkyl-aryl orthophosphate    Dialkyl-aryl orthophosphate wherein R represents an aliphatic group of from 1 to 20 carbon atoms and A is as above defined.

Particularly suitable acids of phosphorus which are beneficially used according to the present invention are the amine derivatives of the organic acids of phosphorus which fall within the following generic formula:

wherein $R_2$ represents a substituted or unsubstituted lower alkylene group of from 1 to 4 carbon atoms such as methylene, ethylene, propylene and butylene, X and Y are selected from the group consisting of hydrogen and an alkyl group of from 1 to 4 carbon atoms and A represents hydrogen, a cation such as sodium, potassium, barium and ammonium or combinations thereof. Compounds which have been found to be quite satisfactory are those wherein $R_2$ is methylene, X and Y and A are hydrogen and homologues of this compound. The results obtainable using the preferred compound are described later in this specification and are included in the appropriate table which follows.

Various organic acids of phosphorus were evaluated for corrosion protection under various test conditions comparable to those in an industrial water system such as a cooling water system and found to have worthwhile features as set forth below.

The effort was to test the corrosiveness of the water system from the standpoint both of steel parts and also copper base alloy parts in contact therewith.

The following test conditions which for convenience are numbered, were used in different experiments:

Test Condition 1

Spinner system—Volume 22 liters
Calcium ion—170 p.p.m. as calcium carbonate
Magnesium ion—10 p.p.m. as calcium carbonate
Sulfate ion—260 p.p.m.
Chloride ion—220 p.p.m.
pH—7.0
Temperature—120° F.
Flow rate—1.5 ft. per second
Duration of test—One day
Aeration—Constant
Test specimens—High carbon steel AISI 1090
Treatment—100 p.p.m. on an active inhibitor basis where known, 100 p.p.m. as is where activity was not known Test Condition 2

This differed from Test Condition 1 in the following respects, all other features being the same:

Spinner system—Volume 7 liters
Flow rate—0.64 ft. per second
Test specimens—3 high carbon steel specimens as above described and one admiralty specimen on each test
Treatment—Described in pertinent table Test Condition 3

This differed from Test Condition 2 in the following respects and in all other features was the same as Test Condition 2:

pH—Described in pertinent table
Duration of test—1 to 3 days
Blowdown—50% daily

Test Condition 4

This was the same as Test Condition 3 except in the following features:

Spinner system—Volume 24 liters
Flow rate—1.5 ft. per second

Test Condition 5

This was the same as Test Condition 1 except as noted below:

Recirculating system—Volume 43 liters
Flow rate—2.0 ft. per second
Duration of test—1 to 3 days
Treatment—Described in pertinent table
Blowdown—44.5% daily
Test specimens—High carbon steel and Admiralty metal; heat transfer tube of low carbon steel (AISI 1010), and wattage of heater 1300

Test Condition 6

This was the same as Test Condition 1 except as noted below:

Spinner system—22 to 24 liters
pH—6 to 7.5 as shown in the pertinent tables
Duration of test—1 to 3 days
Blowdown—50% daily
Treatment—Described in pertinent tables
Water characteristics—Same as Test Condition 1 except as noted in table Test Condition 7

This conforms with Test Condition 5 except for the following changes:

Duration of test—1 to 7 days as explained in the table
Test specimens—Only high carbon steel as above Test Condition 8

This test condition is the same as Test Condition 6 except as noted below:

Spinner system—Volume 22 liters
pH—7.0 except where noted in the table

USE OF ORGANIC ACID OF PHOSPHORUS ALONE

Using Test Condition 1, the control corrosion rate was found to be 123 mils per year (m.p.y.). Table 1 records the results of testing various organic phosphates under Test Condition 1.

Test 49 of Table 1 shows a result for an organic phosphate containing sulphur. The benefit of sulfonation is clearly indicated.

It will be noted in the above tests from Table 1 that pyro- and polyphosphoric acid esters are unusually effective.

TABLE 1.—ORGANIC PHOSPHATES AS CORROSION INHIBITORS

[Test Condition 1]

| Test No. | Sample No. | Compound name | General structure | Moles ethylene oxide per chain | Corrosion rate, m.p.y. |
|---|---|---|---|---|---|
| 1 | | Control (no treatment) | | | 123 |
| 2 | 119 | Methyl orthophosphate | $(RO)PO(OH)_2$ | 0 | 36 |
| 3 | 16 | Amyl orthophosphate | $(RO)PO(OH)_2$ | 0 | 29 |
| 4 | 18 | Isoctyl orthophosphate | $(RO)PO(OH)_2$ | 0 | 15 |
| 5 | 120 | Oleyl orthophosphate | $(RO)PO(OH)_2$ | 0 | 36 |
| 6 | 138 | Diisoamyl orthophosphate | $(RO)_2PO(OH)$ | 0 | 75 |
| 7 | 135 | Diisooctyl orthophosphate | $(RO)_2PO(OH)$ | 0 | 21 |
| 8 | 97 | Didecyl orthophosphate | $(RO)_2PO(OH)$ | 0 | 46 |
| 9 | 15 | Ethylrosin orthophosphate | $(RO)PO(OR')(OH)$ | 0 | 33 |
| 10 | 17 | Triphenyl orthophosphate | $(RO)_3PO$ | 0 | 96 |
| 11 | 38 | Cresyldiphenyl orthophosphate | $(RO)PO(OR')_2$ | 0 | 108 |
| 12 | 78 | Decyl orthophosphate (ethoxylated) | $(RO)PO(O[C_2H_4O]_xH)(OH)$ | 4 | 9 |
| 13 | 79 | Potassium salt of item 12 | $(RO)PO(O[C_2H_4O]_xH)(OH)$ | 4 | 15 |
| 14 | 45 | Octyl orthophosphate (ethoxylated) | $(RO)PO(O[C_2H_4O]_xH)_2$ | 1–10 | 96 |
| 15 | 80 | Nonylphenyl (ethoxylated) orthophosphate | $(R[C_2H_4O]_xO)PO(OH)_2$ | 6 | 46 |
| 16 | 90 | do | $(R[C_2H_4O]_xO)PO(OH)_2$ | 9 | 47 |
| 17 | 83 | do | $(R[C_2H_4O]_xO)PO(OH)_2$ | 10 | 44 |
| 18 | 95 | Tridecyl (ethoxylated) orthophosphate | $(R[C_2H_4O]_xO)PO(OH)_2$ | 10 | 55 |
| 19 | 87 | Dinonylphenyl (ethoxylated) orthophosphate | $(R[C_2H_4O]_xO)PO(OH)_2$ | 4 | 67 |
| 20 | 88 | Barium salt of item 18 | $(R[C_2H_4O]_xO)PO(OH)_2$ | 4 | 20 |
| 21 | 92 | Dinonylphenyl (ethoxylated) orthophosphate | $(R[C_2H_4O]_xO)PO(OH)_2$ | 6 | 62 |
| 22 | 89 | Barium salt of item 21 | $(R[C_2H_4O]_xO)PO(OH)_2$ | 6 | 5 |
| 23 | 10 | Dinonylphenyl (ethoxylated) orthophosphate | $(R[C_2H_4O]_xO)PO(OH)_2$ | 10 | 82 |
| 24 | 113 | Dilauryl (ethoxylated) orthophosphate | $(R[C_2H_4O]_xO)_2PO(OH)$ | 4 | 45 |
| 25 | 114 | Trilauryl (ethoxylated) orthophosphate | $(R[C_2H_4O]_xO)_3PO$ | 4 | 109 |
| 26 | 103 | Tristearyl (ethoxylated) orthophosphate | $(R[C_2H_4O]_xO)_3PO$ | 4 | 103 |
| 27 | 124 | Dimethyl (ethoxylated) polyphosphate | $(R[C_2H_4O]_x)_2(O)(PO_3H)_3$ | 1–10 | 72 |
| 28 | 123 | Diisobutyl (ethoxylated) polyphosphate | $(R[C_2H_4O]_x)_2(O)(PO_3H)_3$ | 1–10 | 92 |
| 29 | 127 | Dihexyl (ethoxylated) polyphosphate | $(R[C_2H_4O]_x)_2(O)(PO_3H)_3$ | 1 | 18 |
| 30 | 62 | Dioctyl (ethoxylated) polyphosphate | $(R[C_2H_4O]_x)_2(O)(PO_3H)_3$ | 1–10 | 19 |
| 31 | 19 | Diisooctyl pyrophosphate polyphosphate | $(RO)[PO(OH)(O)PO(OH)](OR)$ | 0 | 18 |
| 32 | 13 | Penta 2-ethylhexyl pentasodium tripolyphosphate | $R_5Na_5(P_3O_{10})_2$ | 0 | 3 |
| 33 | 28 | Pentaoctyl pentasodium tripolyphosphate | $R_5Na_5(P_3O_{10})_2$ | 0 | 3 |
| 34 | 107 | Dioctyl polyphosphate | $(R)_2(O)(PO_3H)_3$ | 0 | 0 |
| 35 | 108 | Di-2 ethylhexyl polyphosphate | $(R)_2(O)(PO_3H)_3$ | 0 | 3 |
| 36 | 109 | Bis (nonylphenyl) polyphosphate | $(R)_2(O)(PO_3H)_3$ | 0 | 12 |
| 37 | 129 | Dinonyl polyphosphate | $(R)_2(O)(PO_3H)_3$ | 0 | 1 |
| 38 | 130 | Didecyl polyphosphate | $(R)_2(O)(PO_3H)_3$ | 0 | 2 |
| 39 | 22 | Didecyl polyphosphate anhydride | $[(HO)PO(O)PO(OR)]_4O_2$ | 0 | 9 |
| 40 | 21 | Partial potassium salt of hydrolized item 39 | $[(HO)PO(O)PO(OR)]_4O_2$ | 0 | 8 |
| 41 | 76 | Same as item 39 but R group larger than $C_{10}$ | $[(HO)PO(O)PO(OR)]_4O_2$ | 0 | 54 |
| 42 | 60 | Dioctyl (ethoxylated) polyphosphate, amine group present | | 5 | 15 |
| 43 | 61 | Same as item 42, R group is mixed branched | | 5 | 22 |
| 44 | 62 | Same as item 42, R group is nondecyl | | 5 | 20 |
| 45 | 48 | Triethanolamine phosphate | $(HO[C_2H_4]_3NO)PO(OH)_2$ | 0 | 19 |
| 46 | 29 | Stearamido propyldimethyl-B hydroxyethyl ammonium phosphate | $[RC(O)NHC_3H_6N(CH_3)_2C_2H_4O]^+H_2PO_4^-$ | 0 | 11 |
| 47 | 4 | Amino-tri(methyl phosphonic acid) | $N[-CH_2PO(OH)_2]_3$ | 0 | 17 |
| 48 | 5 | Pentasodium salt of item 47 | $N[-CH_2PO(OH)_2]_3$ | 0 | 16 |
| 49 | 27 | Octylphenyl orthophosphate, sulfonated | | 0 | 8 |

Tests 2 to 11 of Table 1 show the results of testing unethoxylated orthophosphate esters. Various mono and di esters of orthophosphoric acid were tested, these compounds being admixtures of mono and di esters. The most effective results are shown in Tests 4 and 7, where the carbon chain length was 8 carbon atoms. It is interesting to note that the triester are counter-indicated, it evidently being important that esterification should not be complete.

Tests 12 to 14 of Table 1 show the results obtained where the orthophosphates were ethoxylated in the nucleus. Unusually good results were obtained in Tests 12 and 13 where R was decyl. Test 14 again shows the counter indication of complete esterification.

Tests 15 to 26 of Table 1 show the results of testing orthophosphates where ethoxylation was on the chain as shown in the formulas given. Conversion of the compound to a barium salt was proved to be beneficial. Triesters are counter indicated in Tests 25 and 26.

Tests 27 to 41 of Table 1 show the results of testing various pyro- and polyphosphate esters. Carbon chain lengths for R of between 8 and 10 carbon atoms appear optimal. Excellent results were obtained in Tests 32, 33, 34, 35, 37, 38, 39, and 40.

Tests 42 to 48 of Table 1 show results for organic amino- and amido phosphates. Good results were obtained even for short chain R groups as in Tests 45, 47 and 48.

Potassium and sodium salts of the organic phosphates were generally effective. The formation of barium salts is also beneficial.

The compounds should not be completely esterified but should have either an unreacted hydrogen atom of the acid or a salt formed, or both.

Carbon chain lengths for R of between 8 and 10 carbon atoms are preferred. The organic amino- and amide-phosphates were effective.

USE OF OTHER ADDITIVES

An attempt was made to evaluate the effect of organic acids of phosphorus when used conjointly with other inhibitors such as zinc ion and mercaptobenzothiazole singly or in combination.

Table 2 evaluates under Test Condition 2 various organic acids of phosphorus fed to provide 50 p.p.m. alone in the test water, and fed to provide in the test water the following combinations:

46 p.p.m. organic phosphate plus 4 p.p.m. zinc ion
44 p.p.m. organic phosphate, 4 p.p.m. zinc ion and 2 p.p.m. mercaptobenzothiazole
48 p.p.m. organic phosphate, 2 p.p.m. mercaptobenzothiazole Before proceeding to these specific examples it appears appropriate to bring out the fact that when the respective tables and explanation therefore refers to p.p.m. of zinc ion, this is what is intended. If a water soluble salt of zinc such as zinc chloride is added to system treated or to produce the composition, the amount of zinc salt added is such as to produce the designated amount of zinc ion which in essence is the corrosion inhibitor.

p.p.m. of the organic phosphate. Tests 5–7 show the synergistic effect of zinc plus the organic phosphate, mercaptobenzothiazole plus the organic phosphate, and mercaptobenzothiazole plus the organic phosphate and zinc. Test 8 indicates the power of this latter combination at a total TABLE 2.—ORGANIC PHOSPHATES (OP) AS CORROSION INHIBITORS, EVALUATION OF ADDITIVES

[Test Condition 2, Corrosion Rates, m.p.y.]

| Test No. | (OP) Type [1] | 50 p.p.m. (OP) | 46 p.p.m. (OP), 4 p.p.m. Zn | 44 p.p.m. (OP), 4 p.p.m. Zn, 2 p.p.m. MBT | 48 p.p.m. (OP), 2 p.p.m. MBT |
|---|---|---|---|---|---|
| 1 | None | 101 | 52 | 66 | 81 |
| 2 | 4 | 12 | 20 | 8 | 7 |
| 3 | 12 | 60 | 5 | 5 | 66 |
| 4 | 13 | 44 | 3 | 7 | 49 |
| 5 | 15 | 38 | 7 | 15 | 33 |
| 6 | 19 | 33 | 5 | 21 | 29 |
| 7 | 20 | 14 | 4 | 14 | 25 |
| 8 | 22 | 46 | 38 | 31 | 30 |
| 9 | 29 | 42 | 13 | 9 | 44 |
| 10 | 30 | 34 | 38 | 18 | 36 |
| 11 | 31 | 21 | 4 | 6 | 63 |
| 12 | 32 | 29 | 7 | 6 | 26 |
| 13 | 33 | 21 | 4 | 2 | 28 |
| 14 | 35 | 66 | 8 | 6 | 64 |
| 15 | 36 | 75 | 32 | 34 | 69 |
| 16 | 38 | 34 | 4 | 1 | 8 |
| 17 | 39 | 29 | 6 | 5 | 24 |
| 18 | 40 | 14 | 6 | 9 | 7 |
| 19 | 42 | 14 | 9 | 11 | 12 |
| 20 | 43 | 15 | 11 | 7 | 29 |
| 21 | 44 | 23 | 5 | 8 | 19 |
| 22 | 45 | 24 | 19 | 4 | 10 |
| 23 | 46 | 27 | 16 | 38 | 38 |
| 24 | 49 | 33 | 7 | 5 | 14 |

[1] Refers to Compound Test Nos. in Table 1.

The test results in mils per year penetration for the high carbon steel specimen are shown in each case in Table 2. Penetration on admiralty metal was uniformly low for each test ranging from 0 to 6 mils per year. The feed was on a 100% active inhibitor basis, but when activity was not known it was assumed to be 100%.

Benefit gradually resulted as shown in Table 2 from using zinc ion with the organic phosphate (Labelled OP). There was also benefit from using the organic phosphate in combination with zinc and mercaptobenzothiazole. The benefit resulting from the use of mercaptobenzothiazole with the organic phosphate was distinct in most cases.

Figure 1:
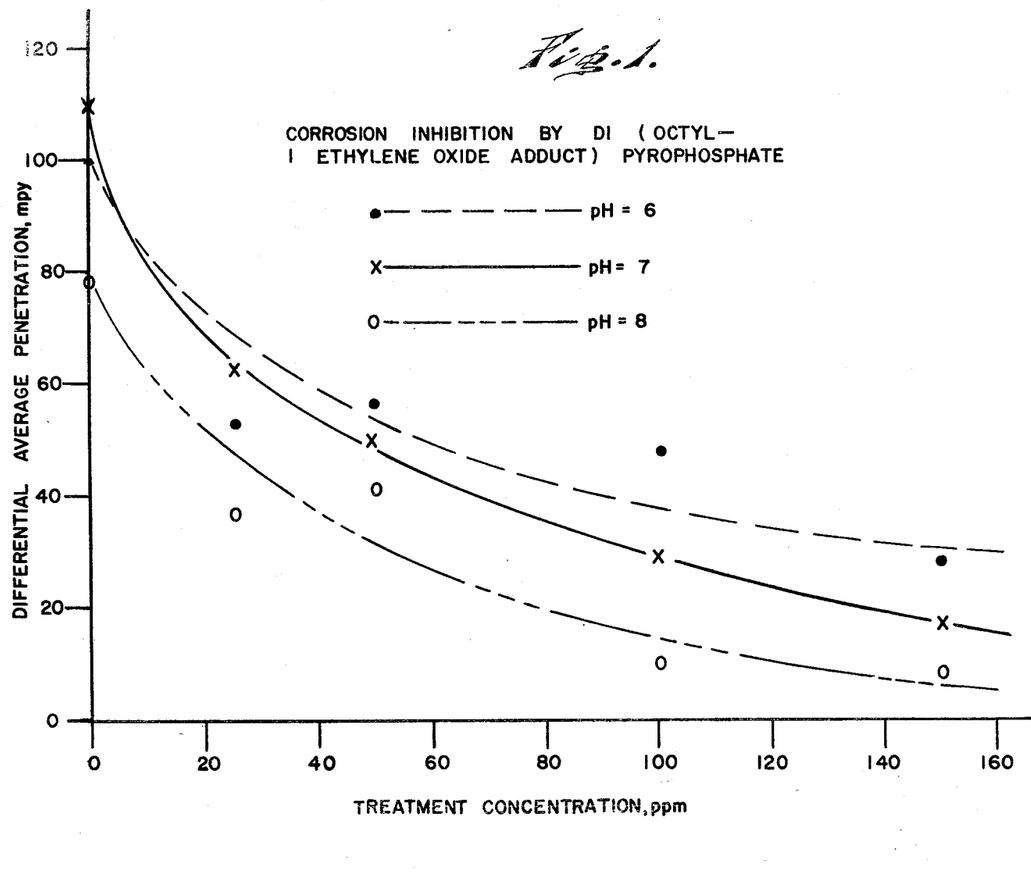
FIG. 1 is a curve plotting differential average penetration in mils per year (m.p.y.) as ordinate and treatment concentration in p.p.m. as abscissae showing values for different pH's.
Figure 2:
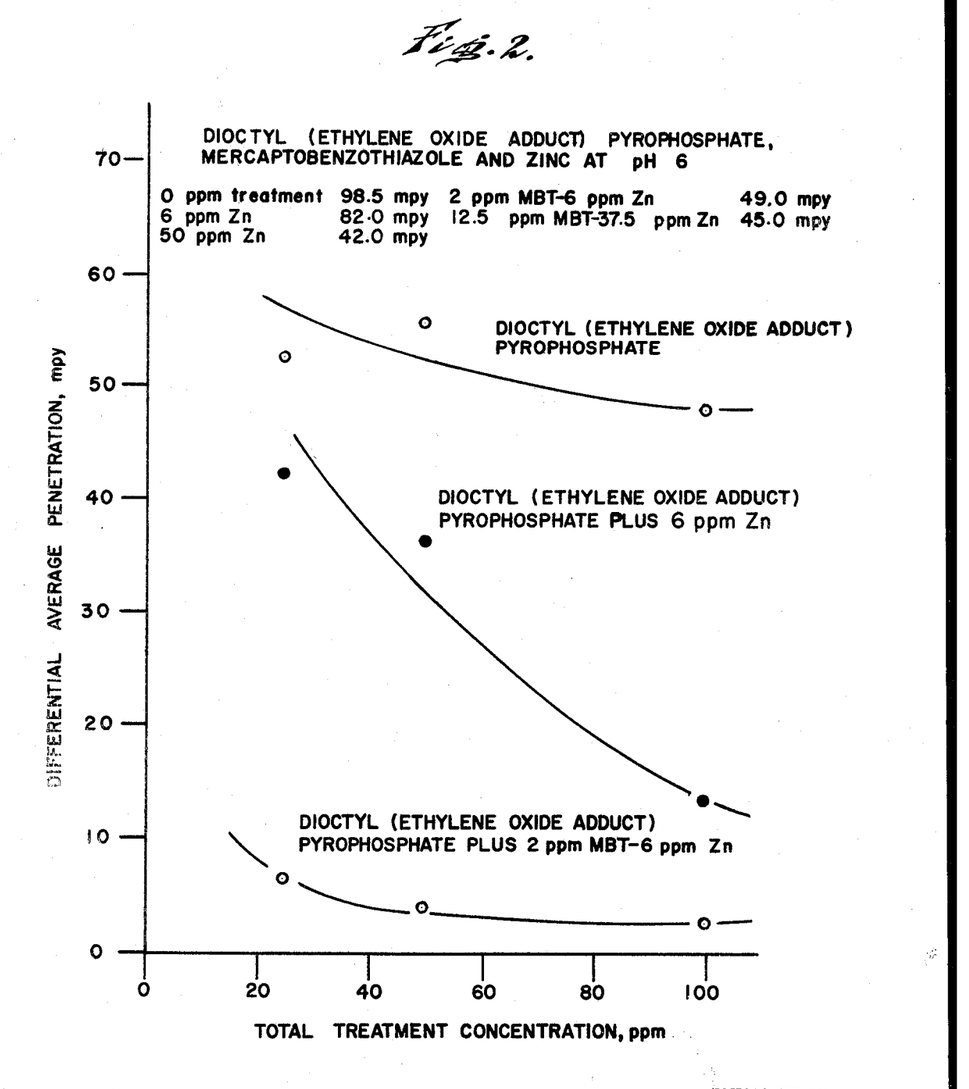
FIG. 2 plots differential average penetration in mils per year as ordinate and total treatment concentration in p.p.m. as abscissae for various combined treatments of substituted acid of phosphorus (phosphate ester), alone, phosphate ester plus zinc and phosphate ester plus mercaptobenzothiazole plus zinc, at pH 6.
Figure 3:
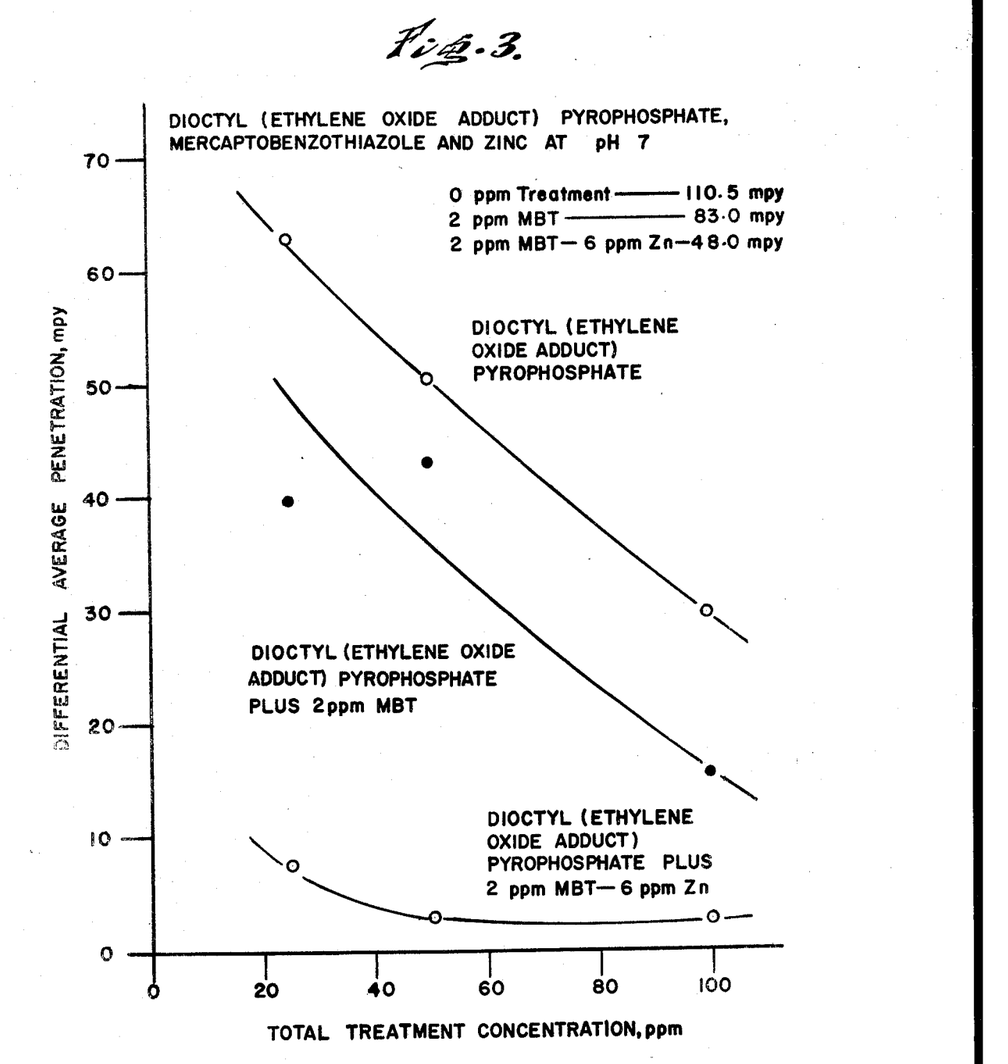
FIG. 3 plots differential average penetration in mils per year as ordinate and total treatment concentration in p.p.m. as abscissae for various combined treatments of substituted acid of phosphorus (phosphate ester) alone, phosphate ester plus mercaptobenzothiazole and phosphate ester plus mercaptobenzothiazole plus zinc, at pH 7.

Tables 3, 4 and 5 and FIGS. 1, 2 and 3 report tests of the organic derivatives with the acids of phosphorus with other additives under Test Condition 3. In all cases the corrosion rate of admiralty metal specimens was acceptably low. Tests were also made, not reported in these tables, on corrosion inhibition of the test agents on steel in non-aerated water. The results were just as favorable.

Table 3 shows definite benefit in the case of dioctyl (1-ethylene oxide adduct) pyrophosphate taken with mercaptobenzothiazole and with zinc ion. Tests 1–3 show control results. Test 4 shows the inhibitory effect of 50 concentration of 27 p.p.m. The benefits of combinations are further shown in Tests 9–16 at total treatment levels of 100 to 150 p.p.m.

Tables 4 and 5 show similar benefits when the organic phosphate is diisooctyl (1 ethylene oxide adduct) pyrophosphate or nonylphenyl (6 ethylene oxide adduct) orthophosphate, respectively.

FIG. 1 plotted for dioctyl (1-ethylene oxide adduct) pyrophosphate shows that inhibition increases generally linerally at pH 6, 7 and 8 in the range between 25 and 150 p.p.m. The effectiveness of the treatment is increased by increasing the pH from 6 to 8.

FIGS. 2 and 3 plot the results from using dioctyl (1-ethylene oxide adduct) pyrophosphate alone and with mercaptobenzothiazole, with zinc ion and with zinc ion plus mercaptobenzothiazole. Distinct benefits are obtained from using mercaptobenzothiazole plus the acid of phosphorus, but greater benefit is obtained by using the acid with zinc ion and still much greater benefit is obtained by using the acid with zinc ion and mercaptobenzothiazole. FIG. 2 shows results at pH 6 and FIG. 3 shows results at pH 7.

TABLE 3.—EVALUATION OF DIOCTYL (1 ETHYLENE OXIDE ADDUCT) PYROPHOSPHATE MERCAPTOBENZOTHIAZOLE AND ZINC COMBINATIONS

[Test Condition 3]

| | Dioctyl Treatment Concentration p.p.m. | | | Differential Average Penetration | |
|---|---|---|---|---|---|
| | Dioctyl (1 ethylene oxide adduct) pyrophosphate | Mercaptobenzothiazole | Zinc | M.p.y. at pH 6 | M.p.y. at pH 7 |
| Test No.: | | | | | |
| 1 | 0 | 0 | 0 | 99 | 111 |
| 2 | 0 | 0 | 15 | 78 | 128 |
| 3 | 0 | 2 | 15 | 70 | 72 |
| 4 | 50 | 0 | 0 | 57 | 52 |
| 5 | 35 | 0 | 15 | 9 | 10 |
| 6 | 35 | 2 | 15 | 4 | 1 |
| 7 | 40 | 10 | 0 | -------- | 7 |
| 8 | 10 | 2 | 15 | 6 | -------- |
| 9 | 100 | 0 | 0 | 52 | 34 |
| 10 | 85 | 0 | 15 | 7 | 4 |
| 11 | 85 | 2 | 15 | 4 | 5 |
| 12 | 150 | 0 | 0 | 35 | 22 |
| 13 | 140 | 2 | 8 | -------- | 1 |
| 14 | 130 | 10 | 10 | -------- | 2 |
| 15 | 130 | 0 | 20 | -------- | 2 |
| 16 | 130 | 20 | 0 | -------- | 2 |

TABLE 4.—EVALUATION OF DIISOOCTYL (1 ETHYLENE OXIDE ADDUCT) PYROPHOSPHATE MERCAPTOBENZOTHIAZOLE AND ZINC COMBINATIONS

[Test Condition 3]

| | Treatment Concentration, p.p.m. | | | Differential average penetration, m.p.y. at pH 7 |
|---|---|---|---|---|
| | Diisooctyl (1 ethylene oxide adduct) pyrophosphate | Mercapto-benzo-thiazole | Zinc | |
| Test No.: | | | | |
| 1 | 50 | 0 | 0 | 57 |
| 2 | 48 | 2 | 0 | 52 |
| 3 | 40 | 10 | 0 | 33 |
| 4 | 44 | 0 | 6 | 9 |
| 5 | 42 | 2 | 6 | 3 |
| 6 | 33 | 2 | 15 | ¹ 0 |
| 7 | 17 | 0 | 6 | 18 |
| 8 | 150 | 0 | 0 | 4 |
| 9 | 130 | 20 | 0 | 4 |
| 10 | 130 | 0 | 20 | 1 |
| 11 | 130 | 10 | 10 | 1 |
| 12 | 140 | 2 | 8 | 1 |

¹ (pH=6).

TABLE 5.—EVALUATION OF NONYLPHENYL (6 ETHYLENE OXIDE ADDUCT) OR THIOPHOSPHATE, MERCAPTOBENZOTHIAZOLE AND ZINC COMBINATIONS

[Test Condition 3]

| | Treatment Concentration, p.p.m. | | | Differential average penetration, m.p.y. at pH 7 |
|---|---|---|---|---|
| | Nonylphenyl (6 ethylene oxide adduct) orthophosphate ¹ | Mercapto-benzo-thiazole | Zinc | |
| Test No.: | | | | |
| 1 | 50 | 0 | 0 | 49 |
| 2 | 48 | 2 | 0 | 38 |
| 3 | 40 | 10 | 0 | 33 |
| 4 | 42 | 2 | 6 | 12 |
| 5 | 150 | 0 | 0 | 17 |
| 6 | 130 | 0 | 20 | 2 |
| 7 | 130 | 10 | 10 | 14 |
| 8 | 140 | 2 | 8 | 13 |
| 9 | 120 | 20 | 10 | 5 |

¹ Product is 60% nonylphenyl (6 ethylene oxide adduct) orthophosphate plus 40% nonylphenol (6 ethylene oxide adduct).

It is evident that there is synergism in the use of the organic acid of phosphorus (orthophosphate, pyrophosphate and polyphosphate) with mercaptobenzothiazole and zinc, and with mercaptobenzothiazole alone and with zinc alone in the case of pyrophosphates and polyphosphates but less benefit is derived in the case of orthophosphates.

Table 6 evaluates amino-tri-(methyl phosphonic acid) alone and with mercaptobenzothiazole and zinc ion. The tests reported in Table 6 were performed under Test Condition 4.

Tests 1–4 illustrates the effective concentrations of the compound while Tests 5 and 6 shows that pH was not significant between pH 6 and pH 7.5. High hardness level in Test 7 was not significant. The addition of zinc ion in Tests 8–9 was beneficial in lowering the critical treatment concentration.

Employment of the organic phosphate ester with mercaptobenzothiazole alone was not as effective as the combination of the organic phosphate ester with mercaptobenzothiazole and the zinc ion, which combination was very successful as shown in Tests 12–13.

TABLE 6.—AQUEOUS CORROSION INHIBITION BY AMINO-TRI (METHYL PHOSPHONIC ACID)

[Test Conditions 4 and 5]

| | Treatment Concentration, p.p.m. | | | | Differential average penetration, m.p.y. |
|---|---|---|---|---|---|
| | Amino-tri (methyl phosphonic acid) | Mercapto-benzo-thiazole | Zinc | pH | |
| Test No.: | | | | | |
| 1 | 0 | 0 | 0 | 7.0 | 168 |
| 2 | 25 | 0 | 0 | 7.0 | 14 |
| 3 | 50 | 0 | 0 | 7.0 | 2 |
| 4 | 150 | 0 | 0 | 7.0 | 2 |
| 5 | 50 | 0 | 0 | 6.0 | 3 |
| 6 | 50 | 0 | 0 | 7.5 | 2 |
| 7 ¹ | 50 | 0 | 0 | 7.0 | 4 |
| 8 | 21 | 0 | 4 | 7.0 | 3 |
| 9 | 15 | 0 | 10 | 7.0 | 3 |
| 10 | 47 | 3 | 0 | 7.0 | 14 |
| 11 | 42 | 8 | 0 | 7.0 | 18 |
| 12 | 42 | 3 | 5 | 7.0 | 1 |
| 13 | 21 | 1.5 | 2.5 | 7.0 | 3 |

¹ Test performed on water having 850 p.p.m. Ca as CaCO₃, 550 p.p.m. Mg as CaCO₃, 560 p.p.m. Cl and 512 p.p.m. SO₄.

Table 7 shows test results under Test Condition 6 obtained from a mixture of octyl polyphosphates.

Table 7 evaluates the corrosion results for octyl polyphosphate, 60% monosubstituted and 40% disubstituted, when fed alone and when fed with zinc ion, with mercaptobenzothiazole and with mercaptobenzothiazole and zinc ion and at different pH values. Percentages are by weight unless otherwise indicated in the specifications.

Increases in treatment concentration from 25–75 p.p.m. were helpful in Table 7. Corrosion inhibition was directly proportional to the pH of the system as shown by Tests 3–6. At a concentration of 50 p.p.m. total treatment, zinc ion was helpful as shown in Tests 7–8. This inhibition was not influenced by lowering the pH. At total treatment levels of 25 p.p.m. the addition of zinc was also very helpful. Combined treatments of the organic acid of phosphorus plus zinc plus mercaptobenzothiazole were very effective as shown by Test 11. Mercaptobenzothiazole along with the organic acid of phosphorus was beneficial in Test 12 at a total treatment concentration of 50 p.p.m. At a total concentration of 25 p.p.m. the combined zinc ion, mercaptobenzothiazole and organic acid of phosphorus treatment was very effective as shown in Tests 13–14.

TABLE 7.—EVALUATION OF DIOCTYL POLYPHOSPHATE

[Test Condition 6]

| | Dioctyl polyphosphate concentration, p.p.m. | Additive concentration, p.p.m. | pH | Test condition variable | Corrosion rate, m.p.y. |
|---|---|---|---|---|---|
| Test No.: | | | | | |
| 1 | 0 | None | 7.0 | None | 168 |
| 2 | 25 | do | 7.0 | do | 50 |
| 3 | 75 | do | 7.0 | do | 11 |
| 4 | 75 | do | 7.5 | do | 10 |
| 5 | 75 | do | 6.5 | do | 27 |
| 6 | 75 | do | 6.0 | do | 49 |
| 7 | 44 | 6 Zn | 7.0 | do | 8 |
| 8 | 48 | 2 Zn | 6.5 | do | 7 |
| 9 | 24 | 1 Zn | 7.0 | do | 22 |
| 10 | 23 | 2 Zn | 7.0 | do | 13 |
| 11 | 46 | 2 Zn-2 MBT | 7.0 | do | 1 |
| 12 | 48 | 2 MBT | 7.0 | do | 8 |
| 13 | 21 | 2 Zn-2 MBT | 6.5 | do | 8 |
| 14 | 17 | 6 Zn-2 MBT | 6.0 | do | 5 |
| 15 | 48 | 2 Zn | 6.5 | 0 p.p.m. hardness | 5 |
| 16 | 48 | 2 Zn | 6.5 | 5X normal ions | 8 |
| 17 | 75 | None | 7.0 | Deaerated | 3 |
| 18 | 46 | 2 Zn-2 MBT | 7.0 | do | 1 |

Changes in ion concentration did not make much difference as shown by Tests 15 and 16. Treatment was also effective in a nearly deaerated system as shown by Tests 17 and 18.

Table 8 reports tests on octylphenyl orthophosphate which has been sulfonated as an example of the alkylaryl sulfonate type of organic acid of phosphorus. The tests were run under Test Condition 8. In Test 2 inhibition was good. In test 3 there was no indication that increased ion content affected inhibition. As shown by Test 4, the removal of oxygen did not change the result. The addition of zinc ion was beneficial in Test 5.

Table 9 shows test results obtained on decyl polyphosphoric acid ester anhydride. The test conditions are those set forth in Test Condition 2. Tests 2 to 4 show that at a feed of 75 p.p.m., decyl polyphosphate anhydride inhibited corrosion effectively. The addition of 2 p.p.m. of zinc ion was beneficial as shown in Test 5. The use of the organic polyphosphate anhydride with mercaptobenzothiazole was effective as shown in Test 6 and the addition of zinc ion to this combination was beneficial as shown in Test 7. When the pH was reduced to 6.0 this three compound treatment was quite effective as shown in Test 8. Change in hardness level did not make a significant difference as shown by Tests 9 and 10. The absence of oxygen did not adversely affect the inhibition as shown by Tests 11 and 12.

TABLE 8.—COOLING WATER CORROSION INHIBITION BY OCTYLPHENYL ORTHOPHOSPHATE SULPHONATED

[Test Condition 8]

| | Concentration, p.p.m. | | | |
|---|---|---|---|---|
| | Octylphenyl orthophosphate sulphonated | Zinc | Water conditions | Corrosion rate, m.p.y. |
| Test No.: | | | | |
| 1 | 0 | 0 | Normal | 168 |
| 2 | 88 | 0 | do | 13 |
| 3 | 88 | 0 | 5X normal ions | 18 |
| 4 | 88 | 0 | Deaerated | 11 |
| 5 | 86 | 2 | Normal | 7 |

TABLE 9.—COMPREHENSIVE EVALUATION OF DECYL POLYPHOSPHATE ANHYDRIDE

[Test Condition 2]

| | Treatment Concentration, p.p.m. | | | | | | |
|---|---|---|---|---|---|---|---|
| | Decyl polyphosphate anhydride | Zinc | Mercaptobenzothiazole | pH | Temperature, °F. | Water characteristics | Corrosion rate, m.p.y. |
| Test No.: | | | | | | | |
| 1 | 0 | 0 | 0 | 7 | 120 | Normal | 101 |
| 2 | 75 | 0 | 0 | 7 | 80 | do | 5 |
| 3 | 75 | 0 | 0 | 7 | 120 | do | 10 |
| 4 | 75 | 0 | 0 | 7 | 160 | do | 12 |
| 5 | 73 | 2 | 0 | 7 | 120 | do | 5 |
| 6 | 73 | 0 | 2 | 7 | 120 | do | 4 |
| 7 | 71 | 2 | 2 | 7 | 120 | do | 3 |
| 8 | 71 | 2 | 2 | 6 | 120 | do | 2 |
| 9 | 75 | 0 | 0 | 7 | 120 | 0 p.p.m. hardness | 10 |
| 10 | 75 | 0 | 0 | 7 | 120 | 5X normal hardness | 10 |
| 11 | 75 | 0 | 0 | 7 | 120 | Deaerated | 9 |
| 12 | 73 | 2 | 0 | 7 | 120 | do | 6 |
| 13 [1] | 100 | 0 | 2 | 7 | 120 | Normal | 7 |

[1] Test condition>.

Decyl polyphosphate anhydride at 100 p.p.m. plus 2 p.p.m. mercaptobenzothiazole was also evaluated according to Test Condition 7. The test involved five days exposure. The corrosion rate was a very low 7 m.p.y.

In summary, therefore, it will be seen that decyl polyphosphate ester anhydride is beneficial as a corrosion inhibitor and conjoint use with zinc or with mercaptobenzothiazole or with both is beneficial. Inhibition occurs at various hardness levels, and with different oxygen concentrations and different pH's.

It will be evident that in the present invention the phosphate compound will be either an acid of phosphorus and/or a water soluble salt of such an acid, which often will be a partial salt, although in some cases it may be a completed salt.

It will be evident in accordance with the invention that the concentration of the organic acid of phosphorus in the circulating water will be between 1 and 200 p.p.m., preferably between 5 and 100 p.p.m. and most desirably between 10 and 50 p.p.m.

It will further be evident that there is an advantage in feeding with the organic acid of phosphorus either in admixture with or as a separate concurrent feed, to maintain in the circulating water from 0.5 to 50 p.p.m. of zinc ion, and/or from 0.5 to 50 p.p.m. of mercaptobenzothiazole.

It will also be evident that in some cases the organic acid of phosphorus may be fed conjointly with the zinc ion and/or mercaptobenzothiazole, preferably in the same blend but permissibly concurrently and separately.

It will further be evident that there is an advantage in using a pyro or a polyphosphate, although orthophosphates may be used with benefit.

It will further be evident that where a water soluble salt of the acid of phosphorus is used, it may often be a sodium salt, potassium salt, ammonium salt, amine salt or preferably a barium salt.

It will further be evident that the organic acid of phosphorus will often be substituted by 1 to 50 moles of ethylene oxide, preferably 1 to 10 moles and most desirably 1 to 5 moles.

In view of our invention and disclosure, variations and modifications to meet individual whim or particular need will doubtless become evident to others skilled in the art to obtain all or part of the benefits of our invention without copying the process and composition shown, and we, therefore, claim all such insofar as they fall within the reasonable spirit and scope of our claims.

Having thus described our invention what we claim as new and desire to secure by Letters Patent is:

1. A process for inhibiting the corrosion of metal parts in contact with a water system, which comprises feeding into the water system a composition consisting essentially of (1) a water soluble acid of phosphorus having (i) at least one OA grouping attached directly to a phosphorus atom of said acid, wherein A is selected from the group consisting of hydrogen, barium, sodium, potassium and ammonium, and (ii) at least one substituent group selected from the class consisting of (a) an alkyl of from 1 to 25 carbon atoms,
(b) an alkenyl of from 1 to 25 carbon atoms,
(c) a mononuclear aryl group
(d) an aliphatic hydrocarbon substituted mononuclear aryl group wherein the aliphatic hydrocarbon has from 1 to 20 carbon atoms; or the corresponding anhydride of said acid, and

(2) at least one corrosion inhibitor selected from the the group consisting of a water soluble zinc compound and mercaptobenzothiazole, the ratio of said acid of phosphorus to said corrosion inhibitor being from 400:1 to 1:50 when said corrosion inhibitor is a zinc compound alone or mercaptobenzothiazole alone, and being from 200:1 to 1:25 when said corrosion inhibitor consists of equal parts by weight of zinc compound and mercaptobenzothiazole, said composition being fed into said system in an amount sufficient to significantly inhibit corrosion.

2. A process according to claim 1 wherein the corrosion inhibitor is a zinc compound and wherein from 1 to 200 parts by weight of said acid of phosphorus per million parts of water and from 0.5 to 50 parts by weight of zinc ion per million parts by weight of water are fed into said water system.

3. A process according to claim 1 wherein the corrosion inhibitor is mercaptobenzothiazole and wherein from 1 to 200 parts by weight of said acid of phosphorus per million parts by weight of water and from 0.5 to 50 parts by weight of said mercaptobenzothiazole per million parts of water are fed into said water system.

4. A process according to claim 1 wherein the corrosion inhibitor is a combination of the zinc compound and mercaptobenzothiazole and wherein from 1 to 200 parts by weight of said acid of phosphorus per million parts by weight of water and from 0.5 to 50 parts by weight of each of said zinc ion and mercaptobenzothiazole per million parts by weight of weight of water are fed into said water system.

5. A process according to claim 1 wherein the acid of phosphorus possesses a formula selected from the group consisting of (1)

(2)

(3)

wherein R is a member selected from the group consisting of an alkyl of from 1 to 25 carbon atoms, an alkenyl of from 1 to 25 carbon atoms, a mononuclear aryl, alkyl substituted mononuclear aryl wherein the alkyl is of from 1 to 20 carbon atoms, alkenyl substituted mononuclear aryl wherein the alkenyl is of from 1 to 20 carbon atoms, and A is selected from the group consisting of hydrogen, sodium, barium, potassium and ammonium, wherein R and A are as above-defined and $x$ is an integer of from 1 to 50,

(5)

wherein R is as above defined, B is selected from the group consisting of R as above defined, hydrogen, barium, potassium, sodium, ammonium, $(CH_2CH_2O)_xH$ and $(CH_2CH_2O)_xR$ wherein R and A are as above defined and $x$ is an integer of from 1 to 50.

(6)

wherein R, A and $x$ are as above defined, (7)

wherein $R_2$ is a lower alkylene group, X and Y are hydrogen or an alkyl group of 1 to 4 carbon atoms and A is hydrogen, sodium, potassium, barium, or ammonium, (8)

wherein R and A are as above defined, (9)

wherein R and A are as above defined, (10)

wherein R and A are as above defined, and (11)

wherein R and A are as above defined.

6. A process according to claim 5 wherein the acid of phosphorus has the formula wherein A is a hydrogen, sodium, potassium, barium and ammonium.

7. A process according to claim 5 wherein the corrosion inhibitor is a zinc compound and wherein from 1 to 200 parts by weight of said acid of phosphorus per million parts of water and from 0.5 to 50 parts by weight of zinc ion per million parts by weight of water are fed into said water system.

8. A process according to claim 7 wherein the acid of phosphorus has the formula wherein A is hydrogen, sodium, potassium, barium and ammonium.

9. A process according to claim 5 wherein the corrosion inhibitor is mercaptobenzothiazole and wherein from 1 to 200 parts by weight of said acid of phosphorus per million parts by weight of water and from 0.5 to 50 parts by weight of mercaptobenzothiazole per million parts of water are fed into said water system.

10. A process according to claim 5 wherein the corrosion inhibitor is a combination of the zinc compound and mercaptobenzothiazole and wherein from 1 to 200 parts by weight of said acid of phosphorus per million parts by weight of water and from 0.5 to 50 parts by weight of each zinc ion and mercaptobenzothiazole per million parts by weight of water are fed into said water system.

11. A water treatment composition consisting essentially of
(1) a water soluble acid of phosphorus having
(i) at least one OA grouping attached directly to a phosphorus atom of said acid, wherein A is selected from the group consisting of hydrogen, barium, sodium, potassium and ammonium, and
(ii) at least one substituent group selected from the class consisting of
(a) an alkyl of from 1 to 25 carbon atoms,
(b) an alkenyl of from 1 to 25 carbon atoms,
(c) a mononuclear aryl group
(d) an aliphatic hydrocarbon substituted mononuclear aryl group wherein the aliphatic hydrocarbon has from 1 to 20 carbon atoms; or the corresponding anhydride of said acid, and
(2) at least one corrosion inhibitor selected from the group consisting of a water soluble zinc compound and mercaptobenzothiazole, the ratio of said acid of phosphorus to said corrosion inhibitor being from 400:1 to 1:50 when said corrosion inhibitor is a zinc compound alone or mercaptobenzothiazole alone, and being from 200:1 to 1:25 when said corrosion inhibitor consists of equal parts by weight of zinc compound and mercaptobenzothiazole.

12. A water treating composition according to claim 11 which contains from about 66 to 80% by weight of said acid of phosphorus and from about 33 to 20% by weight of zinc ion.

13. A water treatment composition according to claim 11 which contains from about 66 to 80% by weight of said acid of phosphorus and from about 33 to 20% by weight of mercaptobenzothiazole.

14. A water treatment composition according to claim 11 which contains from about 50 to 66% by weight of said acid of phosphorus, from about 16 to 25% by weight of said zinc ion and from about 16 to 25% by weight of mercaptobenzothiazole.

15. A water treatment composition according to claim 11 wherein said acid of phosphorus possesses a formula selected from the group consisting of (1)

$$RO-\overset{\overset{O}{\|}}{\underset{\underset{OA}{|}}{P}}-OA$$

(2)

$$RO-\overset{\overset{O}{\|}}{\underset{\underset{OA}{|}}{P}}-OR$$

(3)

$$RO-\overset{\overset{O}{\|}}{\underset{\underset{OA}{|}}{P}}-O-\overset{\overset{O}{\|}}{\underset{\underset{OA}{|}}{P}}-OR$$

wherein R is a member selected from the group consisting of an alkyl of from 1 to 25 carbon atoms, an alkenyl of from 1 to 25 carbon atoms, a mononuclear aryl, alkyl substituted mononuclear aryl wherein the alkyl is of from 1 to 20 carbon atoms, alkenyl substituted mononuclear aryl wherein the alkenyl is of from 1 to 20 carbon atoms, and A is selected from the group consisting of hydrogen, sodium, barium, potassium and ammonium, (4)

$$RO-\overset{\overset{O}{\|}}{\underset{\underset{O(CH_2-CH_2O)_xH}{|}}{P}}-OA$$

wherein R and A are as above-defined and x is an integer of from 1 to 50, (5)

$$R(OCH_2CH_2)_x-O-\overset{\overset{O}{\|}}{\underset{\underset{OA}{|}}{P}}-OB$$

wherein R is as above defined, B is selected from the group consisting of R as above defined, hydrogen, barium, potassium, sodium, ammonium, $(CH_2CH_2O)_xH$ and $(CH_2CH_2O)_xR$ wherein R and A are as above defined and x is an integer of from 1 to 50, (6)

$$R(OCH_2CH_2)_x-O-\overset{\overset{O}{\|}}{\underset{\underset{OA}{|}}{P}}-O-\overset{\overset{O}{\|}}{\underset{\underset{OA}{|}}{P}}-O(CH_2CH_2O)_xR$$

wherein R, A and x are as above defined, (7)

$$N{\left[-\overset{\overset{X}{|}}{\underset{\underset{Y}{|}}{R_2}}-\overset{\overset{O}{\|}}{\underset{\underset{OA}{|}}{P}}-OA\right]}_3$$

wherein $R_2$ is a lower alkylene group, X and Y are hydrogen or an alkyl group of 1 to 4 carbon atoms and A is hydrogen, sodium, potassium, barium or ammonium, (8)

$$R-\overset{\overset{H}{|}}{N}-\overset{\overset{O}{\|}}{\underset{\underset{OA}{|}}{P}}-OA$$

wherein R and A are as above defined, (9)

$$R-\overset{\overset{R}{|}}{N}-\overset{\overset{O}{\|}}{\underset{\underset{OA}{|}}{P}}-OA$$

wherein R and A are as above defined, (10)

$$RS-\overset{\overset{O}{\|}}{\underset{\underset{OA}{|}}{P}}-OA$$

wherein R and A are as above defined, and (11)

$$RO-\overset{\overset{S}{\|}}{\underset{\underset{O}{|}}{P}}-OA$$

wherein R and A are as above defined.

16. A water treatment composition according to claim 15 wherein the acid of phosphorus has the formula $$N{\left[-CH_2-\overset{\overset{O}{\|}}{\underset{\underset{OA}{|}}{P}}-OA\right]}_3$$

wherein A is hydrogen, sodium, potassium, barium and ammonium.

17. A water treating composition according to claim 15 which contains from about 66 to 80% by weight of said acid of phosphorus and from about 33 to 20% by weight of zinc ion.

18. A water treatment composition according to claim 17 wherein the acid of phosphorus has the formula $$N{\left[-CH_2-\overset{\overset{O}{\|}}{\underset{\underset{OA}{|}}{P}}-OA\right]}_3$$

wherein A is hydrogen, sodium, potassium, barium and ammonium.

19. A water treatment composition according to claim 15 which contains from about 66 to 80% by weight of said acid of phosphorus and from about 33 to 20% by weight of mercaptobenzothiazole.

20. A water treatment composition according to claim 15 which contains from about 50 to 66% by weight of said acid of phosphorus, from about 16 to 25% by weight of said zinc ion and from about 16 to 25% by weight of mercaptobenzothiazole.

21. A water composition according to claim 14 wherein the acid of phosphorus is a di (octyl-1-ethylene oxide adduct) pyrophosphate having the formula, $$CH_3(CH_2)_7OCH_2CH_2-O\overset{\overset{O}{\|}}{\underset{\underset{OH}{|}}{P}}-O-\overset{\overset{O}{\|}}{\underset{\underset{OH}{|}}{P}}O-CH_2CH_2O(CH_2)_7CH_3$$

(References on following page)

References Cited

UNITED STATES PATENTS

| | | | |
|---|---|---|---|
| 2,900,222 | 8/1959 | Kahler et al. | 252—387 X |
| 3,133,787 | 5/1964 | Kelley | 21—2.7 |
| 3,222,291 | 12/1965 | Heit et al. | 252—389 |

RICHARD D. LOVERING, Primary Examiner

I. GLUCK, Assistant Examiner

U.S. Cl. X.R.

21—2.7; 252—390

Dedication 3,510,436.—*Ronald M. Silverstein*, Parsippany, N.J., *Chester A. Bishof*, North Hills, and *Joseph T. Matey*, Levittown, Pa. CORROSION INHIBITION IN WATER SYSTEM. Patent dated May 5, 1970. Dedication filed Nov. 4, 1974, by the assignee, *Betz Laboratories, Inc.*

Hereby dedicates to the Public the entire remaining term of said patent.
[*Official Gazette July 1, 1975.*]